United States Patent Office 2,998,435
Patented Aug. 29, 1961

2,998,435
3β-HYDROXY AND 3β-ACYLOXY-6 METHYL-ANDROST-5-EN-17-ONES AND PROCESS THEREFOR
Vladimir Petrow and David Neville Kirk, London, England, assignors to The British Drug Houses, London, England, a British company
No Drawing. Filed Jan. 8, 1959, Ser. No. 785,582
Claims priority, application Great Britain Jan. 10, 1958
8 Claims. (Cl. 260—397.4)

This invention is for improvements in or relating to organic compounds and has particular reference to 3β-hydroxy- and 3β-acyloxy-6-methylandrost-5-en-17-ones.

It is an object of the present invention to provide the new steroidal compound 3β-hydroxy-6-methylandrost-5-en-17-one and the corresponding 3β-acyloxy-derivatives of general formula

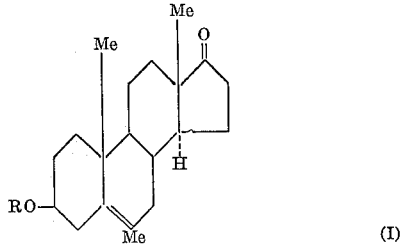

(where $R=H$ or an acyl group containing up to ten carbon atoms), which are of value as intermediates in the preparation of compounds with useful biological properties. Thus, for example, they can be converted into 6α-methylethisterone and its 21-alkyl derivatives, which form a group of potent orally active progestational agents.

The compounds having the general formula I of the present invention may be converted into the 17β-hydroxy-17α-ethynyl derivative by condensation with acetylene by procedures known to those skilled in the art and subsequently submitted to the Oppenauer oxidation when the progestational agent 6α-methylethisterone is obtained.

According to the present invention there is provided a process for the preparation of a 3β-acyloxy-6-methylandrost-5-en-17-one, which process comprises converting a 3β-acyloxy-6-methylpregna-5:16-dien-20-one having the general formula

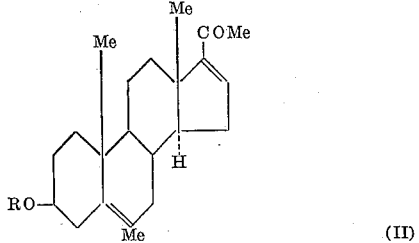

(where R is an acyl group having up to ten carbon atoms) into a 3β-acyloxy-6-methyl-20-oximinopregna-5:16-diene having the general formula

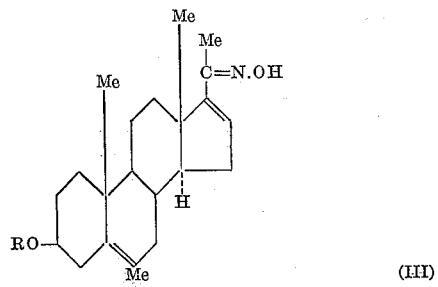

(where R has the same meaning as above) which is then submitted to the Beckmann rearrangement and the rearrangement product hydrolysed to yield 3β-acyloxy-6-methylandrost-5-en-17-one having the general formula

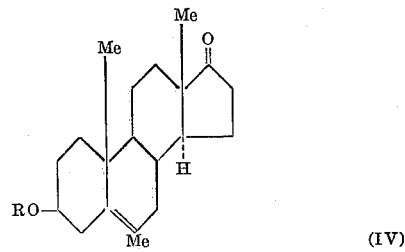

(where R has the same meaning as above).

The 3β-acyloxy-6-methylandrost-5-en-17-one may then be saponified to 3β-hydroxy-6-methylandrost-5-en-17-one (IV; $R=H$) by standard methods well known to those skilled in the art.

Conversion of a 3β-acyloxy-6-methylpregna-5:16-dien-20-one (II) into the corresponding 20-oximino-compound (III) may readily be achieved by standard methods such as for example reaction with a hydroxylamine salt such as the hydrochloride in a basic solvent such as pyridine, or ethanol containing sodium acetate.

Beckmann rearrangement of the 20-oximino-derivative (III) may be performed employing reagents normally used for effecting this transformation. Particularly valuable are the benzene- and toluene-p-sulphonyl chlorides which are conveniently employed in a basic solvent such as pyridine, with or without the addition of an organic solvent as diluent such as ether or chloroform. The rearrangement is preferably performed at temperatures not exceeding room temperature and conveniently within the range $-5°$ C. to $+5°$ C. Other useful reagents for performing the Beckmann rearrangement are phosphorus pentachloride, which is conveniently employed in ether or benzene, and phosphorus oxychloride in pyridine.

Hydrolysis of the product of the Beckmann rearrangement is conveniently performed, employing aqueous or aqueous ethanolic hydrochloric or sulphuric acid, at temperatures in the region of room temperature, when the product is the desired 17-ketone. The 3β-acyl group may undergo partial hydrolysis during the foregoing acid treatment, and the resulting material may be reacylated to give the 3β-acyloxy-6-methylandrost-5-en-17-one, or alternatively the hydrolysis of the 3β-acyl group may be carried to completion by treatment with, for example, aqueous methanolic alkali, to give 3β-hydroxy-6-methylandrost-5-en-17-one (I; $R=H$). The last compound may be converted into its 3β-acyl derivatives by methods well known to those skilled in the art.

Following is a description by way of example of methods of carrying the invention into effect.

*Example I*

3β-acetoxy-6-methylpregna-5:16-dien-20-one (1.45 g.) and hydroxylamine hydrochloride (0.5 g.) in ethanol (9 ml.) and pyridine (1.75 ml.) were heated under reflux for ½ hour. Water (1.5 ml.) was then added, and the solution cooled to 0° C., when it deposited 3β-acetoxy-6-methyl-20-oximinopregna-5:16-diene in needles, M.P. 190 to 192° C., $[\alpha]_D^{24}-46°$ (c., 0.35 in chloroform), $\lambda_{max.}$ 237 mμ ($\epsilon=15,800$) in ethanol.

The foregoing oximino derivative (1.35 g.) in anhydrous pyridine (5 ml.) was cooled to 0° C. and treated in small portions with toluene-p-sulphonyl chloride (1.6 g.) in pyridine (5 ml.), the temperature of the mixture being held below 5° C. After 2 hours the temperature of the mixture was allowed to rise to about 20° C. for 2 hours, then the mixture was poured into crushed ice (50 g.) and concentrated sulphuric acid (12 ml.) and left overnight at 0° C. Ether was then added, and the ether layer was separated and washed, and the solvent removed. The residue, in methanol (20 ml.) containing potassium hydroxide 1 g.) and water (2 ml.), was heated under reflux for ½ hour, then poured into water. Extraction with ether, the extract being washed, dried and evaporated, gave 3β-hydroxy-6-methylandrost-5-en-17-one, which separated from aqueous methanol (80%) in needles, M.P. 146 to 148° C., $[\alpha]_D^{21}$ −11° (c., 0.23 in chloroform).

3β-acetoxy-6-methylandrost-5-en-17-one prepared from the foregoing compound by heating it (400 mg.) in pyridine (2 ml.) and acetic anhydride (5 ml.) on the steam bath of ½ hour formed leaflets, M.P. 149 to 151° C., $[\alpha]_D^{20}$ −22° (c., 0.72 in chloroform) after crystallisation from aqueous methanol (80%).

*Example II*

The 20-oximino derivative (1 g., prepared as described in Example I) was dissolved in anhydrous benzene (20 ml.), and shaken with phosphorus pentachloride (1 g.) for ½ hour, with external cooling below 10° C. The resulting mixture was poured into water, and the benzene layer separated and evaporated under reduced pressure. The residue was treated with methanol (20 ml.) and concentrated hydrochloric acid (0.25 ml.) for 18 hours at room temperature, then poured into water. Extraction with ether, and evaporation, gave an oily product which was treated with acetic anhydride (3 ml.) and pyridine (1 ml.) on the steam bath for ½ hour, giving 3β-acetoxy-6-methylandrost-5-en-17-one, leaflets from 80% aqueous methanol, M.P. 149 to 150° C., not depressed in admixture with the sample prepared under Example I.

Hydrolysis with aqueous ethanolic potassium hydroxide gave the free alcohol, 3β-hydroxy-6-methylandrost-5-en-17-one.

*Example III*

The 20-oximino derivative (20 g. prepared as described in Example I) was dissolved in anhydrous pyridine (107 ml.), the solution cooled to −15° C. and a solution of phosphorus oxychloride (40 ml.) in pyridine (120 ml.) was added dropwise with stirring, the temperature meanwhile being kept below 0° C. The addition was completed in ½ hour, and the mixture was allowed to stand and warm to room temperature for 2 hours, then poured with stirring into a mixture of crushed ice (300 g.) and concentrated hydrochloric acid (300 ml.).

The mixture was allowed to stand for 18 hours at room temperature, and the granular precipitate was collected and purified from methanol, giving 3β-acetoxy-6-methylandrost-5-en-17-one.

*Example IV*

3β-capryloxy-6-methylpregna-5:16-dien-20-one was prepared by treating 3β-hydroxy-6-methylpregna-5:16-dien-20-one (5 g.) in pyridine (50 ml.) with capryl (decanoyl) chloride (5 ml.) and the mixture was left at room temperature for 2 hours, when it was poured into dilute sodium bicarbonate solution and stirred for 2 hours. The product was extracted with ether, and the ethereal extract washed with water, dilute sulphuric acid and water, dried and evaporated. Purification from aqueous ethanol gave 3β-capryloxy-6-methylpregna-5:16-dien-20-one, M.P. 59 to 61° C., $[\alpha]_D^{18}$ −26° (c., 0.24 in chloroform).

3β-capryloxy-6-methyl - 20 - oximinopregna-5:16-diene was prepared as described in Example I. It had M.P. 107 to 108° C., $\lambda_{max}$. 236 mμ (ε=15,280) in ethanol.

Beckmann rearrangement of 3β-capryloxy-6-methyl-20-oximinopregna-5:16-diene was carried out as described in Example III to give 3β-capryloxy-6-methylandrost-5-en-17-one, which was purified from aqueous ethanol to give needles, M.P. 89 to 91° C., $[\alpha]_D^{19}$ −3° (c., 0.14 in chloroform).

Hydrolysis with aqueous methanolic potassium hydroxide furnished 3β-hydroxy-6-methylandrost-5-en-17-one, M.P. 146° to 148° C.

We claim:
1. A process for the preparation of a 3β-acyloxy-6-methylandrost-5-en - 17 - one, which process comprises reacting a 3β-acyloxy-6-methylpregna-5:16-dien-20-one having the general formula

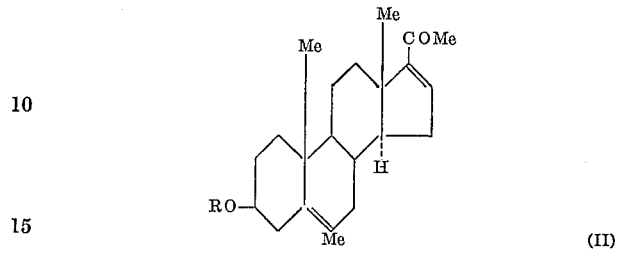

where R is an acyl group derived from an alkanoic acid having up to ten carbon atoms with an hydroxyl amine acid addition salt in pyridine to convert said compound (II) into a corresponding 3β-acyloxy-6-methyl-20-oximinopregna-5:16-diene having the general formula

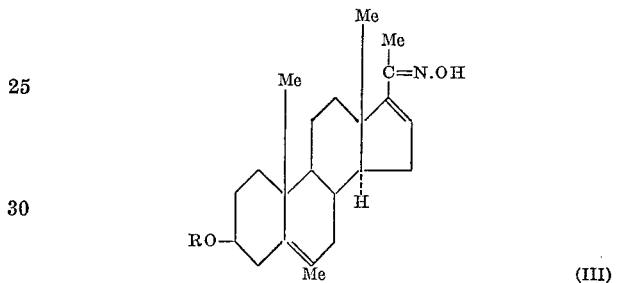

where R has the same meaning as above, submitting said 20-oximino to the Beckmann rearrangement and hydrolyzing the rearrangement product to yield 3β-acyloxy-6-methylandrost-5-en-17-one having the general formula

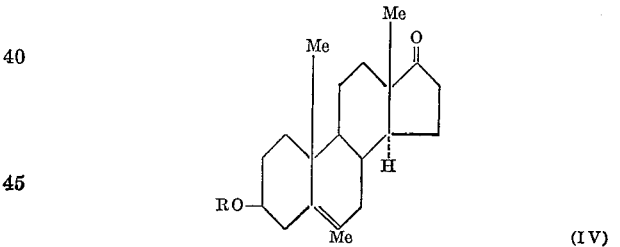

where R has the same meaning as above.

2. A process as claimed in claim 1 wherein the Beckmann rearrangement is performed with toluene-p-sulphonyl chloride in pyridine.

3. A process as claimed in claim 1 wherein the Beckmann rearrangement is performed with phosphorus pentachloride in benzene.

4. A process as claimed in claim 1 wherein the Beckmann rearrangement is performed with phosphorus oxychloride in pyridine.

5. 3-β-hydroxy-6-methylandrost-5-en-17-one.

6. 3β-acyloxy-6-methylandrost-5-en - 17 - ones wherein the acyl portion of said 3β-acyloxy group is derived from an alkanoic acid having up to 10 carbon atoms.

7. 3β-acetoxy-6-methylandrost-5-en-17-one.

8. 3β-capryloxy-6-methylandrost-5-en-17-one.

References Cited in the file of this patent
UNITED STATES PATENTS

| | | |
|---|---|---|
| 2,335,616 | Tendick et al. | Nov. 30, 1943 |
| 2,656,364 | Hershberg et al. | Oct. 20, 1953 |
| 2,871,246 | Loken | Jan. 27, 1959 |

OTHER REFERENCES

Fieser and Fieser: Natural Products Related to Phenanthrene, 3rd edit., 1949, page 393.

Campbell et al.: 80 J.A.C.S., 4717–21 (1958).